Patented Oct. 11, 1949

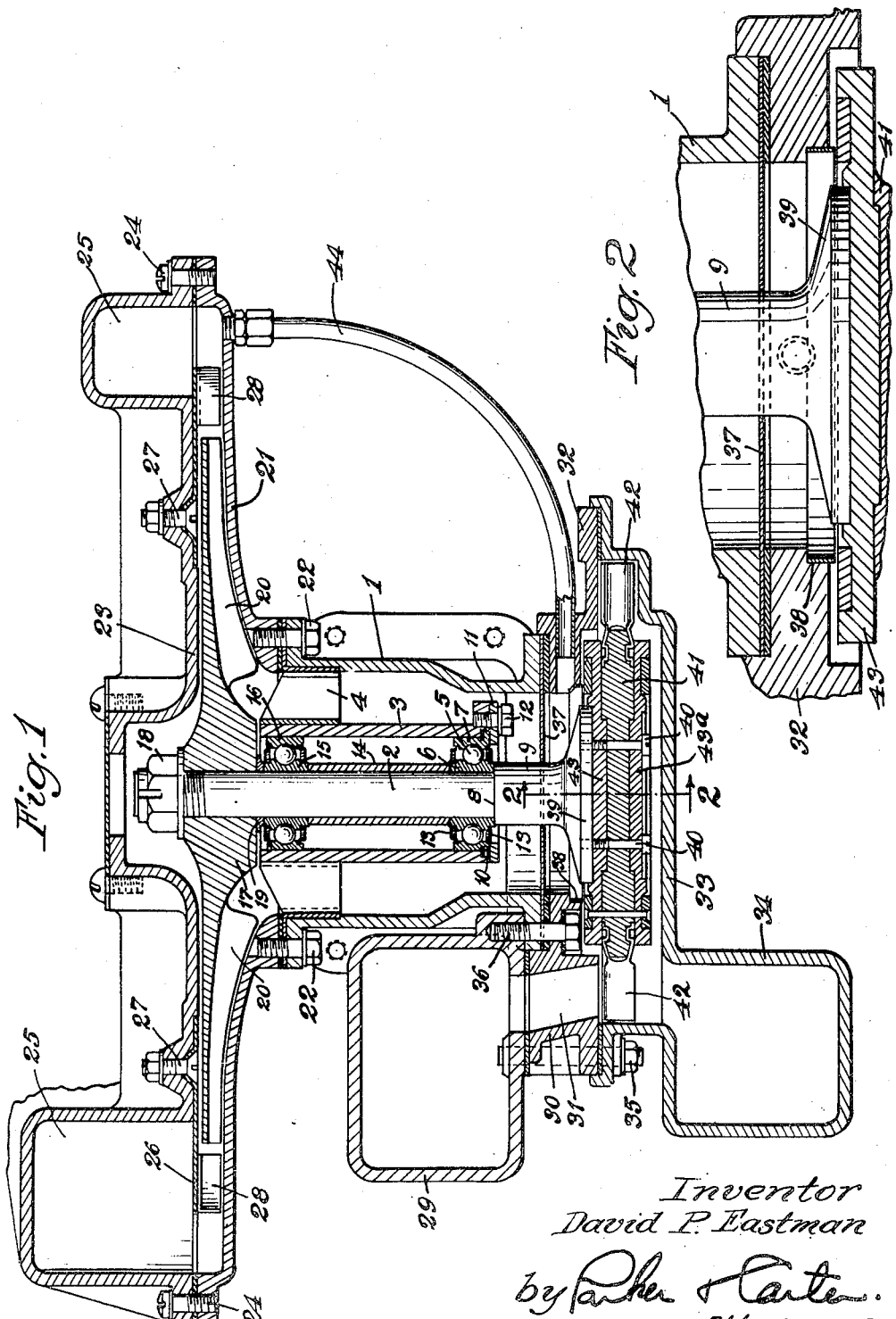

2,484,275

UNITED STATES PATENT OFFICE 2,484,275

SUPERCHARGER SEAL

David P. Eastman, Chicago, Ill., assignor to United Specialties Company, Chicago, Ill., a corporation of Delaware Application September 19, 1947, Serial No. 775,066

18 Claims. (Cl. 230—116)

This invention relates to means and a method for preventing overheating in turbo-superchargers, gas turbines or turbine driven blowers. It has for one object to provide means for shielding the major part of a turbo-supercharger assembly or turbine driven blower from heat present at the turbine.

It has for another object to provide fluid pressure means for resisting and limiting the spread or transmission of heat from the turbine zone to the remainder of the turbo-supercharger or turbine driven blower.

Other objects will appear from time to time throughout the specification and claims.

This invention is illustrated more or less diagrammatically in the accompanying drawings, wherein:

Figure 1 is a longitudinal section through a turbo-supercharger assembly with the turbine shaft shown in elevation; and Figure 2 is a sectional detail taken at line 2—2 of Figure 1.

Like parts are indicated by like characters throughout the specification and the drawings.

The invention may be applied to turbo-supercharger assemblies or turbine driven blowers and to turbines alone where air under pressure is available. The particular details of the turbine proper and the blower form no essential part of the invention, which is not limited to a construction embodying such details.

In the particular form here shown a tubular housing 1 surrounds a shaft 2. A sleeve-like bearing casing member 3 is positioned within the housing 1 and is held in place by supporting members 4. These supporting members 4 comprise the sole supporting means by which the sleeve 3 and the anti-friction bearings which it encloses are supported from the housing 1. Thus the sleeve 3 is supported from the housing 1 solely by members which are positioned as far away as possible from the turbine rotor and from the zone which is generally heated by the propelling gases. The result of this construction is that no metal or readily conductive path is provided for the ready conduction of heat directly from the heated zone to the bearings or to the bearing support. An anti-friction bearing 5 is positioned adjacent one end of the sleeve 3 and includes conventional inner and outer races 6 and 7, respectively. The inner race is positioned about the shaft 2 and is seated against a shoulder 8 formed by the enlargement 9 of the shaft. The outer race 7 includes a laterally extending flange 10 which is engaged between the sleeve 3 and a retaining ring 11 which is itself held removably in place by one or more screws 12.

Enclosing and covering members 13, 13 are provided for the bearing. A spacing sleeve 14 is positioned about the shaft 2 and bears at one end against the inner race 6.

A conventional anti-friction bearing is positioned adjacent the upper end of the sleeve 3 and includes an inner race 15 and an outer race 16. The outer race is fixed within the sleeve 3 and the inner race is fixed by the spacer 14 and is held in place by the blower wheel 17, which is itself held in place upon the shaft 2 by a nut 18. A spacing member 19 may be positioned between the race 15 and the wheel 17.

The wheel 17 carries blades 20 and is enclosed within a two-part housing. The housing includes a lower member 21 held to the housing portion 1 by screws 22, or otherwise. 23 is an upper housing member which is secured by screws 24 to the underhousing member 21. The fan or impeller 17 discharges peripherally into a scroll 25 from which the air or gas is discharged to a point of use. A ring 26 may be secured to the housing portion 23 by bolts 27, and carries a plurality of diffuser members 28.

29 is an inlet member through which exhaust gases reach the turbine. 30 is a nozzle plate provided with one or more nozzle passages 31 through which gas is discharged against the turbine buckets. 32 is a closure member which is secured to the turbine housing 33 and which with it encloses the turbine. An outlet passage is formed by a member 34. The inlet passage member 29, the nozzle block 30 and the housing 33 are held together by bolts 35, or otherwise.

One or more screws 36 assist in securing the inlet passage 29 within the assembly. A shield member 37 is held at the bottom of the housing section 1 and closes the passage through that member. The clearance between the member 37 and the enlargement 9 of the shaft 2 is reduced to a minimum so that the escape of heated gases or the transmission of heat generally upwardly along the shaft 2 is limited so far as possible.

A ring 38 is secured within the housing and extends as closely as possible to the upper surface of the turbine wheel, thus further preventing the escape of heated gases and heat generally from the heated zone to and along the shaft 2 and the bearings which support it.

The turbine wheel may be of many different designs, and the one shown is merely illustrative. The shaft enlargement 9 may be further enlarged, as at 39, and the turbine wheel is secured to it by screws 40. The turbine wheel comprises, as shown, a disc-like member 41 to which the turbine buckets 42 are secured. The member 41 as shown is shaped to engage parts of the buckets and two retainer plates 43a and 43 are secured about the member 41 to hold the bucket parts in place and to prevent displacement of the buckets from the turbine wheel.

A passage member or conduit 44 leads from the scroll 25 to the space above the baffle 38 and thus as the system operates air or gas under pressure is discharged from the scroll 25 into the zone about the lower end of the shaft 2 between the baffle or shielding members 37 and 38, and thus a pressure differential is built up in this zone which resists the upward passage of heated gases. The air introduced is cooler than the temperature about the turbine wheel and some cooling effect is caused by its introduction. Because it establishes a flow of pressure outwardly along the turbine wheel, it prevents the development of pressure upwardly along the shaft.

The cool air which is supplied to the chamber between the baffles 37 and 38 may conveniently be supplied from the compressor, but it might equally well be supplied from any other source. The compressor case or an independent source of air under sufficient pressure might be used as the means for supplying air to accomplish the cooling.

In general, whatever the source of the cooling air, its purpose is to reduce or eliminate heat transfer which might result from higher pressure occurring in the hot gas chamber. Were this to occur, the higher pressure in the hot gas area could escape and would carry with it the hot gases to the zone of the bearings and shaft. The space between the two baffles 37 and 38 is therefore pressurized to a degree exceeding the pressure on the hot gas side so that cold gas or cooler gas from the space between the sealing plates or baffles 37 and 38 will leak out through the clearance between the lower baffle 38 and into the space on the hot gas side. Thus the hot gas is prevented by the pressure difference from blowing upwardly along the shaft and bearings.

Although the baffles 37 and 38 are shown one about the shaft and the other close to the turbine wheel, it is to be understood that they might both extend close to the shaft or they might both extend close to the turbine wheel. In each case the baffles would be separated by a small clearance from the shaft or the hub or the turbine wheel. It may be said, therefore, that the shaft and turbine wheel may be considered as a unit, and together they comprise a rotor assembly. The invention may be carried out by setting up by means of baffles a pressure zone about the rotor unit or assembly, and in this pressure zone there is established a pressure sufficient to overcome the pressure of the hot gases about the turbine blade area. The baffles thus come close to this rotor assembly at two points and establish the pressure zone.

In the claims the word "minimum" has been used with regard to the clearance between the baffles and the parts of the rotating members which they approach. This word is not to be taken as meaning the absolute possible mechanical minimum of clearance. A small or reduced clearance is within the contemplation of the invention. The purpose of the baffles is to limit, and so far as possible to limit the travel of heat and heated gases away from the turbine and along the shaft and about the bearings. For this purpose the clearance between the baffles and the rotating parts adjacent them should be kept small, and the word "minimum" where used in the claims is to be understood as meaning a small or a limited clearance between the baffles and the rotating parts, rather than the absolute possible mechanical minimum of clearance.

Although I have shown an operative form of my invention, it will be recognized that many changes in the form, shape and arrangement of parts can be made without departing from the spirit of the invention, and my showing is therefore to be taken as, in a sense, diagrammatic.

The use and operation of this invention are as follows:

With the device assembled as shown, exhaust gases are discharged into the member 29 and pass through the nozzle opening or openings 31 to impinge upon the turbine buckets 42, thus causing the turbine wheel to rotate. The gases pass from the buckets into the member 34 and are discharged. As the turbine wheel rotates it rotates the shaft 2 to which it is fixed and the impeller 17, and air is centrifugally compressed by the impeller and discharged through the scroll 25 to a point of use, for example, to the engine from which the exhaust gases are led into the member 29.

The temperature of the exhaust gases is high and the turbine wheel and the zone about it is heated. Experience has shown that unless definite measures are taken to prevent the spread of the heat, the shaft and bearings in particular and other parts as well are overheated, thus causing unsatisfactory operation and sometimes complete failure of the device.

To combat the spread of heat, the present invention comprises two main features. The first is the provision of baffles or partitions between the heated zone and the zone in which the bearings are located, and the second is the provision of a positive current of air or gas from the compressor to the heated zone. The baffle means comprise the ring 38 which is provided with a minimum clearance between it and the adjacent part of the turbine wheel assembly.

The second baffle comprises the perforated disc 37 which is provided with a minimum clearance between it and the adjacent part of the shaft 2—namely, the shaft enlargement 9. These two baffles together comprise means for preventing or limiting the possibility of an upward movement of a current of heated gas moving from the turbine or turbine zone toward the bearing zone. The conduit 44 provides means for directing a current or blast of air or gas under compression into the heated zone and, in particular in the form here shown, into the zone between the two baffles 37 and 38, and thus a hydrostatic differential is set up which prevents the upward movement of a current of heated air or gas and which also has the effect of supplying a cooled gaseous medium to the most heated zone. Therefore, as the device operates and as heat is developed at and about the turbine wheel, the air or gas which is compressed by the compressor is utilized to carry out a cooling effect and to prevent the transmission of heat in any form from the turbine zone to the bearing zone and to other parts of the apparatus as a whole. This, together with the mechanical baffles 37 and 38, assures satisfactory cooling and prevents heating of the bearings and other parts which must be kept reasonably cool for satisfactory operation.

I claim:

1. In combination in a turbo-blower assembly, a shaft, a turbine wheel and a compressor wheel fixed to said shaft, a housing part about said shaft, a housing part about said turbine, and a housing about said compressor, a baffle positioned about said shaft and closing the space within its housing, there being a minimum clearance between said baffle and said shaft, a second baffle positioned about said shaft and extending toward said turbine, there being a minimum clearance between said second baffle and said turbine, and means for transmitting pressure fluid to a point between said baffles, the clearance between said baffles and said shaft and turbine comprising the only outlet from the space between said baffles.

2. In combination in a turbo-blower assembly, a shaft, bearings for said shaft, a turbine wheel and a compressor wheel fixed to said shaft, a housing part about said shaft and bearings, a housing part about said turbine, and a housing about said compressor, a baffle positioned about said shaft and closing the space within its housing, there being a minimum clearance between said baffle and said shaft, and a second baffle positioned about said shaft and extending toward said turbine, there being a minimum clearance between said second baffle and said turbine, the clearance between said baffles and said shaft and turbine comprising the only outlet from the space between said baffles.

3. In combination in a turbo-blower assembly, a shaft, bearings for said shaft, a turbine wheel and a compressor wheel fixed to said shaft, a housing part about said shaft and bearings, a housing part about said turbine, and a housing about said compressor, a baffle positioned about said shaft and closing the space within its housing, there being a minimum clearance between said baffle and said shaft, a second baffle positioned about said shaft and extending toward said turbine, there being a minimum clearance between said second baffle and said turbine, and means for transmitting pressure fluid to a point between said baffles, the clearance between said baffles and said shaft and turbine comprising the only outlet from the space between said baffles.

4. In combination in a turbo-blower assembly, a shaft, bearings for said shaft, a turbine wheel and a compressor wheel fixed to said shaft, a housing part about said shaft and bearings, a housing part about said turbine, and a housing about said compressor, a baffle positioned about said shaft and closing the space within its housing, there being a minimum clearance between said baffle and said shaft, a second baffle positioned about said shaft and extending toward said turbine, there being a minimum clearance between said second baffle and said turbine, and means for transmitting pressure fluid to a point between said baffles, the clearance between said baffles and said shaft and turbine comprising the only outlet from the space between said baffles, said means comprising a conduit leading from a source of pressure to the zone between said baffles.

5. In combination in a turbo-blower assembly, a shaft, bearings for said shaft, a turbine wheel and a compressor wheel fixed to said shaft, a housing part about said shaft and bearings, a housing part about said turbine, and a housing about said compressor, said housing parts being joined together and intercommunicative, a baffle positioned about said shaft and closing the space within its housing, there being a minimum clearance between said baffle and said shaft, and a second baffle positioned about said shaft and extending toward said turbine, there being a minimum clearance between said second baffle and said turbine, and means for transmitting pressure fluid from said compressor housing to a point between said baffles, the clearance between said baffles and said shaft and turbine comprising the only outlet from the space between said baffles.

6. In combination in a turbo-blower assembly, a shaft, bearings for said shaft, a turbine wheel and a compressor wheel fixed to said shaft, a housing part about said shaft and bearings, a housing part about said turbine, and a housing about said compressor, said housing parts being joined together and intercommunicative, a baffle positioned about said shaft and closing the space within its housing, there being a minimum clearance between said baffle and said shaft, a second baffle positioned about said shaft and extending toward said turbine, there being a minimum clearance between said second baffle and said turbine, and means for transmitting pressure fluid from said compressor housing to a point between said baffles, the clearance between said baffles and said shaft and turbine comprising the only outlet from the space between said baffles, said means comprising a conduit leading from said compressor housing to the zone between said baffles.

7. In combination in a turbo-blower assembly, a turbine wheel and a compressor wheel, a shaft, both wheels being fixed to said shaft, housing means enclosing the turbine and the compressor, and means for preventing the heating of said assembly comprising a plurality of baffles positioned within the housing about said shaft, and a gas conduit extending from said compressor housing to the zone between said baffles, the clearance between said baffles and said shaft and turbine comprising the only outlet from the space between said baffles.

8. In combination in a turbo-blower assembly, a turbine wheel and a compressor wheel, a shaft, both wheels being fixed to said shaft, housing means enclosing the turbine and the compressor, and means for preventing the heating of said assembly comprising a plurality of baffles positioned within the housing about said shaft, one of said baffles extending close to said shaft, the other of said baffles extending close to said turbine wheel, and a gas conduit extending from said compressor housing to the zone between said baffles, the clearance between said baffles and said shaft and turbine comprising the only outlet from the space between said baffles.

9. In combination in a turbine driven blower assembly, a shaft, a turbine wheel and a compressor wheel, said shaft and said two wheels constituting a rotor assembly, a housing about said shaft, a housing about said turbine and a housing about said compressor, a plurality of baffles positioned at spaced points supported on one of said housings and approaching said rotor assembly at separated points, there being a minimum clearance between said baffles and said rotor assembly, the said clearance comprising the only outlet from the space enclosed by said baffles.

10. In combination in a turbine driven blower assembly, a shaft, a turbine wheel and a compressor wheel, said shaft and said two wheels constituting a rotor assembly, a housing about said shaft, a housing about said turbine and a housing about said compressor, a plurality of baffles positioned at spaced points supported on one of said housings and approaching said rotor assembly at separated points, there being a minimum clearance between said baffles and said rotor assembly, and means for applying cooling fluid to the zone between said baffles at a pressure greater than that established about said turbine wheel, the said clearance comprising the only outlet from the space enclosed by said baffles.

11. In combination in a turbine driven blower assembly, a shaft, a turbine wheel and a compressor wheel, said shaft and said two wheels constituting a rotor assembly, a housing about said shaft, a housing about said turbine and a housing about said compressor, a plurality of baffles positioned at spaced points supported on one of said housings and approaching said rotor assembly at separated points, there being a minimum clearance between said baffles and said rotor assembly, and means for establishing a current of cooling air under pressure within the zone between said baffles to resist the upward movement of gases from said turbine housing, the said clearance comprising the only outlet from the space enclosed by said baffles.

12. In combination, a shaft, a turbine rotor and a compressor fixed to said shaft apart from each other, said shaft comprising the only connection between said rotor and compressor, a housing part fully surrounding said shaft, and means for supporting said shaft from said housing, said means comprising a bearing and a support therefor, said bearing support being carried from said housing by a member which is joined to said housing only at a point spaced away from said turbine, said part comprising the sole means for supporting said bearing from said housing.

13. In combination, a turbine wheel and a compressor wheel, a shaft, both wheels being fixed to said shaft, bearings supporting said shaft, and housing means about said shaft and bearings, the sole means for supporting said bearings comprising parts joined to said housing at a point spaced substantially away from said turbine wheel, and means for preventing the heating of said assembly, said means comprising a plurality of baffles positioned within the housing about said shaft, one of said baffles extending close to said shaft, the other of said baffles extending close to said turbine wheel, and a cooling gas conduit extending from said compressor housing to the zone between said baffles.

14. In combination, a turbine wheel and a compressor wheel, a shaft, the said two wheels being fixed thereto in spaced relationship, an intake housing communicating with said compressor and surrounding said shaft throughout the major portion of its length, a bearing for said shaft, and means for supporting said bearing within and from said housing, said supporting means comprising the sole support for said bearing and comprising parts positioned to support said bearing and joined to said housing only at points positioned away from said turbine wheel.

15. In combination, a turbine wheel and a compressor wheel, a shaft, said wheels being fixed in spaced relation on said shaft, a housing fully surrounding said shaft, a housing for said compressor wheel, said housing being positioned between the turbine and compressor, an inlet passage for conducting cooling gases to said turbine wheel, said passage being positioned generally between said turbine and said compressor, and a bearing for said shaft, and means for supporting said bearing from said housing, said support comprising members supporting said bearing and joined to and located within said housing and positioned away from said turbine wheel, said bearing being otherwise unconnected to said first-mentioned housing.

16. In combination, a shaft, a turbine rotor and a compressor, said turbine rotor and compressor being fixed to said shaft, apart and disconnected from each other, a housing fully surrounding said shaft, and means for supporting said shaft from said housing, said means comprising a bearing and a support therefor located within said housing, said bearing support being carried from said housing by a member positioned within and joined to said housing adjacent its outlet in the direction of the compressor, said bearing support comprising the sole means for supporting said bearing from said housing.

17. In combination, a turbine, a compressor and a shaft, the turbine and compressor being fixed on the shaft in spaced relation, a member for conducting hot gases to said turbine, a bearing for said shaft, and a housing fully enclosing said shaft and said bearing, said housing approaching said turbine at one end and approaching said compressor at its opposite end, said turbine and said means for introducing hot gases thereto comprising means which create a heated zone adjacent one end of said housing, the opposite end of said housing comprising a relatively cool zone, and means for supporting said shaft and said bearing from said housing, said means comprising supporting parts engaging said housing wholly within its cool zone, said supporting members being wholly enclosed within said housing.

18. In combination in a turboblower assembly, a shaft, a turbine wheel, a compressor wheel fixed to said shaft, a housing part about said shaft, a housing part about said turbine wheel, a housing about said compressor, a baffle positioned about said shaft and closing the space within its housing, there being a minimum clearance between said baffle and said shaft, a second baffle positioned about said shaft and extending in the direction of said turbine, there being a minimum clearance between said second baffle and said turbine, and means for creating fluid pressure within the space between said baffles and said turbine, the only outlet from said space comprising the clearances between said baffles and the said shaft and said turbine.

DAVID P. EASTMAN.

REFERENCES CITED

The following references are of record in the file of this patent:

UNITED STATES PATENTS

| Number | Name | Date |
|---|---|---|
| 1,076,142 | Mellin | Oct. 21, 1913 |
| 2,089,708 | Puffer | Aug. 10, 1937 |
| 2,180,168 | Puffer | Nov. 14, 1939 |
| 2,269,181 | Clarke | Jan. 6, 1942 |
| 2,364,189 | Buchi | Dec. 5, 1944 |
| 2,372,467 | Alford | Mar. 27, 1945 |
| 2,382,842 | Alford | Aug. 14, 1945 |
| 2,401,826 | Halford | June 11, 1946 |
| 2,440,069 | Bloomberg | Apr. 20, 1948 |
| 2,442,579 | Auger | June 11, 1948 |

FOREIGN PATENTS

| Number | Country | Date |
|---|---|---|
| 847,190 | France | Oct. 4, 1939 |